United States Patent [19]
Paulini et al.

[11] Patent Number: 5,224,160
[45] Date of Patent: Jun. 29, 1993

[54] PROCESS FOR SECURING AND FOR CHECKING THE INTEGRITY OF THE SECURED PROGRAMS

[75] Inventors: Werner Paulini, Salzkotten; Dietmar Wessel, Delbrück, both of Fed. Rep. of Germany

[73] Assignee: Siemens Nixdorf Informationssysteme AG, Paderborn, Fed. Rep. of Germany

[21] Appl. No.: 855,169

[22] Filed: Mar. 20, 1992

Related U.S. Application Data

[63] Continuation of Ser. No. 704,712, May 17, 1991, abandoned, which is a continuation of Ser. No. 158,407, Feb. 22, 1988, abandoned.

[30] Foreign Application Priority Data

Feb. 23, 1987 [DE] Fed. Rep. of Germany ....... 3705736

[51] Int. Cl.$^5$ .................... H04L 9/00; H04K 1/00
[52] U.S. Cl. .............................. 380/4; 380/28
[58] Field of Search ....................... 380/4, 28

[56] References Cited

U.S. PATENT DOCUMENTS

| | | | |
|---|---|---|---|
| 4,120,030 | 10/1978 | Johnstone | 364/200 |
| 4,433,207 | 2/1984 | Best | |
| 4,471,163 | 9/1984 | Donald et al. | 364/200 |
| 4,609,777 | 9/1986 | Cargile | |
| 4,683,553 | 7/1987 | Mollier | 380/4 |
| 4,740,890 | 4/1988 | William | 380/4 |

FOREIGN PATENT DOCUMENTS 2650795 5/1978 Fed. Rep. of Germany .

OTHER PUBLICATIONS

G. Kafka, Elektronik, Jun. 1984, p. 159.

Primary Examiner—Stephen C. Buczinski
Attorney, Agent, or Firm—Varnum, Riddering, Schmidt & Howlett

[57] ABSTRACT

For securing programs contained in a system storage and for checking their integrity, the programs are in each case coded by a symmetric cryptographic algorithm with the application of a readback secured, secret key, and a check number for each program is simultaneously formed and stored in the storage of the system. For checking the integrity, the programs are then coded again in the same manner and the check number thus obtained in each case is compared with the check number stored at the first coding. It is possible to derive from the result of comparison a criteria for activation or locking the following programs.

13 Claims, 4 Drawing Sheets

PROCESS FOR SECURING AND FOR CHECKING THE INTEGRITY OF THE SECURED PROGRAMS

This is a continuation, of application Ser. No. 704,712 filed May 17, 1991, now abandoned: This is a continuation, application Ser. No. 07/158,407 filed on Feb. 22, 1988 and now abandoned.

TECHNICAL FIELD

The invention relates to a process for protecting the programs of a data processing system against unauthorized changes.

BACKGROUND ART

In the data processing units of current computer systems, system control programs, i.e., the operating system, and application programs are stored in a system memory, for example, a magnetic disc. In the operation of a data processing system, programs are loaded into and executed from a working memory in order to control the work flow of the data processing system within the framework of the operating system and to perform data processing tasks specified by the user within the framework of the application system.

Together with the data processing systems, computing nets were developed in which individual computers intercommunicate. The information exchange which proceed here extensively must be safeguarded against fraudulent manipulations especially in areas of applications such as banking, insurance, business or administration. Such manipulations may take place at the level of the program and possibly lead to the effect that a computer executes undesired, additional, too few, or changed commands. This can result in the evaluation of personal data persons in an unauthorized manner, which can have the consequences that related personal data are fraudulently evaluated, processed and further transferred, and that computer outputs are effected to the advantage of unauthorized persons or cause other types of damage for the user of the computer net or third parties.

Since it is very difficult for a user of a computer net to recognize manipulated programs and to then provide integrity by means of corrective measures, it is desirable to be able to automatically recognize unauthorized manipulation of the programs and to also be able to automatically prevent the execution of these manipulated programs. The only heretofore known processes for securing programs use codes to prevent the unauthorized copying and require special processors for the execution of such programs. Such safety measures prevent an unauthorized commercial use and transfer of the programs but cannot recognize manipulations of programs in computer nets and prevent fraudulent execution of the programs. It is also possible to provide a resource and access check by the application of passwords or users' catalogs, or to keep data private or to take physical measures, such as authorization by means of special switches or keys, in order to obtain a certain protection against unauthorized manipulations. However, these possibilities are comparably worthless when a programmer or similarly qualified personnel has access to the computer net. Based on a special professional knowledge, it is then possible to manipulate programs in spite of protective measures of the type mentioned above.

SUMMARY OF THE INVENTION

Therefore, it is an object of the invention to provide a process by which it is possible to automatically recognize the manipulation of programs in a data processing system, without substantial damage to the efficiency of the system, and to automatically prevent execution of the manipulated programs.

In accordance with this invention, at least the programs which effect the system in initializations are coded by application of a symmetric cryptographic algorithm using a readback protected, stored, secret key for forming a test number, which is stored in the memory of the system. A successive, repeated program coding of this kind is used for checking the integrity at system initialization of the data processing unit, and in each case the thus obtained test numbers are compared with the respectively stored test numbers so that, in case of a negative comparison result, the activation of the respective subsequent starting steps of the system and programs can be blocked.

With the help of the invention it is possible to recognize manipulations in the entire program system of a data processing unit, i.e., in the operating system and application system automatically, and to interrupt the operation immediately, upon detection of such a manipulation, during system start-up. An effective "sealing" of the programs, or a sealed system storage or a system carrier is thus obtained which takes effect already at the starting of the data processing system, since that is when the checking of integrity takes place. In order to safeguard the programs, the system storage is provided with additional information in the form of test numbers which are the results of coding steps that are executed by taking a secret key as a basis. In a computer net with an administration computer and several target computers, it is possible to seal the system carrier for the respective target computer, in this manner, in the administration computer, and the test numbers can serve as logistical keys for all programs stored in the system carrier which are loadable and necessary in the course of action of the application system. These are the resident programs of the operation system, as well as all programs which are stored in executable form in loading libraries. Since a secret key, which is stored readback protected, is used for this sealing, every unauthorized manipulation of the programs must lead to an error signal (alarm) during the integrity check in the target computer wherein each program is once again coded using the same secret key to form test numbers to be compared according to the invention and causing an error signal, since the coding that is performed for the manipulated program leads to a different test number than the one which was produced for the unmanipulated program in the administration computer. The error (alarm) signal can then be used for an automatic blocking of the activation of subsequent programs.

The coding is made by using a symmetric, cryptographic algorithm. This coding principle offers, as it is known, a very high grade of security against decoding. The best known algorithm of the kind is the DES algorithm (DES=Data Encryption Standard). The description of a coded text runs in a precisely opposite sequence to that in which the encryption of the clear (plain) text has been executed. Therefore, it is called a symmetric process. The high level of security of this algorithm is due to its mathematical properties which lead to the fact that the knowledge of the clear text and equally of the respective cipher text is not sufficient for determining the secret key with a justifiable expenditure. However, the DES algorithm is inserted within the framework of the invention not for the purpose of coding data, but for deriving a check sum in the coding of programs.

The readback protected storage of the key used for coding is known, and a special security module with which each computer of the computer net is equipped can be supplied. The security module can contain a storage into which the key to be used is stored in a physically inaccessible form. As will be further shown, the security module can also contain further hardware function units which can further enhance the security obtained by the invention.

Since the process according to the invention is executed according to the course of the program system in a chain of sequential coding steps, checking steps, the security obtained thereby can be further increased against the effect of unauthorized manipulations of the program when the test numbers of the first program that effects the starting of the operation of the system, the so-called original loading program, is stored in readback protected form. This additional measure prevents knowledge of the first test number appearing in the checking sequence and thus makes impossible an attempt to use this test number to determine the secret key by which the coding of the original loading program has also been executed. Thereby the first testing action within the framework of the integrity check is absolutely safe against unauthorized access and change.

BRIEF DESCRIPTION OF THE DRAWINGS

The invention will now be described with reference to the drawings in which.

DETAILED DESCRIPTION

The following explains how the process for securing the programs according to the invention is executed in a practical application with an administration computer and a target computer. It applies in general that system carrier executable by a target computer is provided with additional information in the form of a check number in the administration computer. These check numbers result from several coding steps executed by application of a secret key stored in a security module to which the programs stored on the system carrier are submitted. The check numbers are logic seals for all programs stored on the system carrier of the target computer, which are loadable and necessary for the functioning of the application system. In addition, for starting, a check number is produced here which is stored in the security module in readback protected form. All other check numbers can be freely accessible and readably stored on the system carrier, since the secret key for the coding steps is not accessible. The security module of the target computer works in such a fashion that the key that is stored in it is used only for computing a check number and simultaneously comparing this check number with a reference check number fed into the security module. As a result, the security module cannot release any check numbers but emits basically a yes-no value whether or not the computed check number corresponds with the reference check number, i.e., within the target computer system it is impossible to make an unauthorized computation of the PZ-check number without knowing the secret key.

After a system carrier has been provided with additional information in the administration computer in the described manner, this system carrier can be used in the target computer. When starting the operation of the target computer system, the checking of the integrity is automatically effected within the procedure starting the system that runs the application program. Several check steps result and a respective check step is caused only when its program code has proven to be unchanged by the prior check step.

The first check step is initiated by the original loading program and executed in the security module. Thereby, this logic is physically not freely accessible. Should the original loading program be logically influenced, i.e., changed, then such a change is already established with the first check step within the security module, and the security module is deactivated so that it cannot be used anymore for the subsequent check steps, and these cannot be executed.

Figure 1:
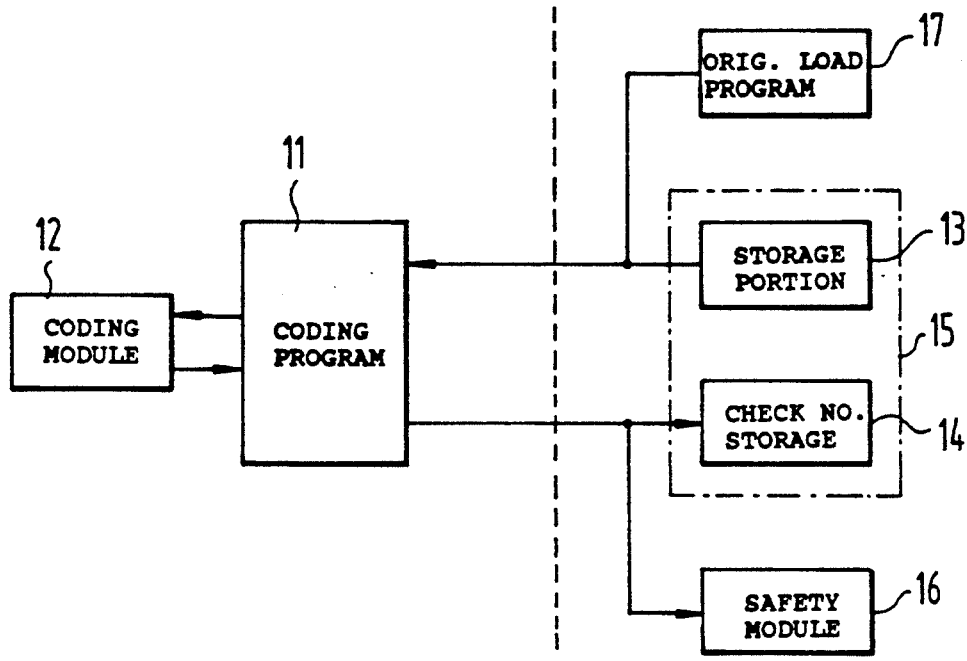
FIG. 1 shows the reciprocal arrangement and interaction of components of an administration computer during the execution of the operation.

FIG. 1 shows how the system carrier and the security module of a target computer can be submitted to a process according the invention in the administration computer. On the left side of the vertically dashed line are schematically illustrated the components of the administration computer which are active within the framework of the securing procedure, while the right side shows the passive components which must be prepared for application in the target computer. Active components are a coding program 11 by which the individual coding steps to be executed for the computing of check numbers are controlled, and a coding module 12 to which, controlled by the coding program 11, the individual programs to be secured are fed-in, so that it can emit a check number for each program. Passive components are a system carrier 15 with a check number memory 14 and a clear text storing portion 13, for secured programs, as well as a security module 16 and an original load program storage 17 for an original loading program.

During the preparation of the passive components to be used on the target computer, an original loading program from the original load program storage 17 is first emitted, under control of the coding program 11, to the coding module 12 which, by application of the secret key which is available to it, computes the respective check numbers of the original loading program. This is then emitted by the coding module 12 and, under control by the coding program 11, fed into the security module 16. Simultaneously, the secret key is transmitted by this step to the security module 16 and stored in readback protected storage.

The check numbers for the programs contained in the clear text storage 13 of the system carrier 15 will then be computed and stored, under control of the coding program 11, in the check number storage 14 of the system carrier 15. All coding steps which are performed in the coding module 12 of the administration computer are based on the secret key which is stored in the coding module 12.

Figure 2:
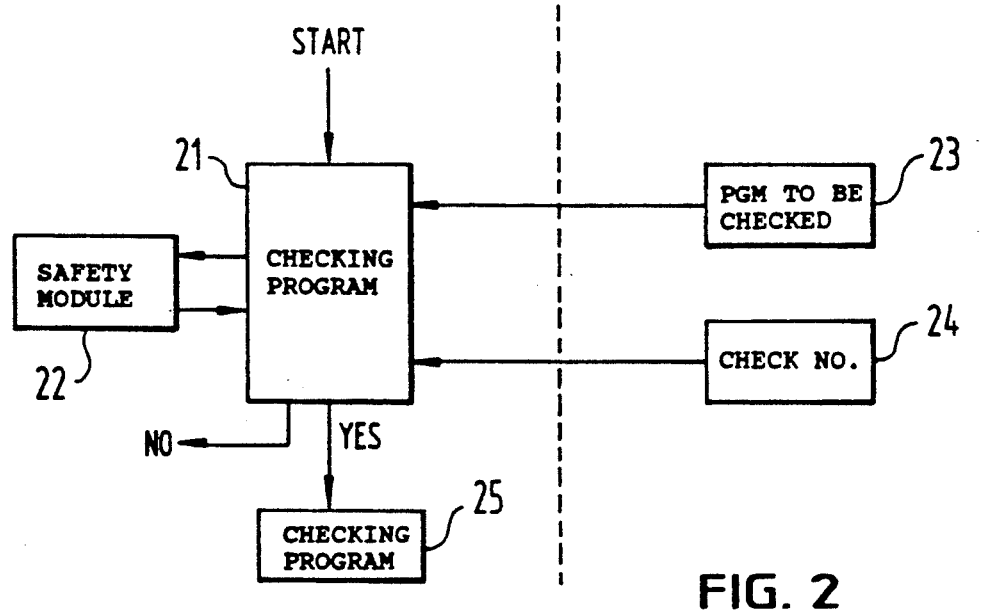
FIG. 2 shows the reciprocal arrangement and interaction of the components of a target computer during the execution of the operation.

FIG. 2 shows how a system carrier prepared in the described manner and a security module can be installed into a target computer for checking the integrity of programs in general. A check step is illustrated as a part of a chain of check steps performed during the loading phase of the system of the target computer. On the left side of a vertically dashed line are illustrated active components. On the right side are illustrated passive components of the target controller. Each check step is executed with a checking program 21 that is designated as a checking unit and the object of checking, namely, a program 23 to be checked and a respective check number 24 are fed to a security module 22 which computes a check number, for each program that is fed into it in the described manner, using the secret key which is inserted into it and compares the check number with the respective reference check number 24 fed into it. The result of comparison is transferred by the security module 22, controlled by the checking program 21, in the form of a yes-no logic to the next testing instance which is the just checked program, in the case of a yes-logic. In case of a no-logic, a special function is activated that can signal the error situation and interrupt, for example, a course of the system, causing an error report or otherwise forcing a correction intervention.

The entire above-described process is induced by a start signal led into the check program 21 that can be the yes-logic of the previous check step or the initial start signal for starting the system.

Figure 3:
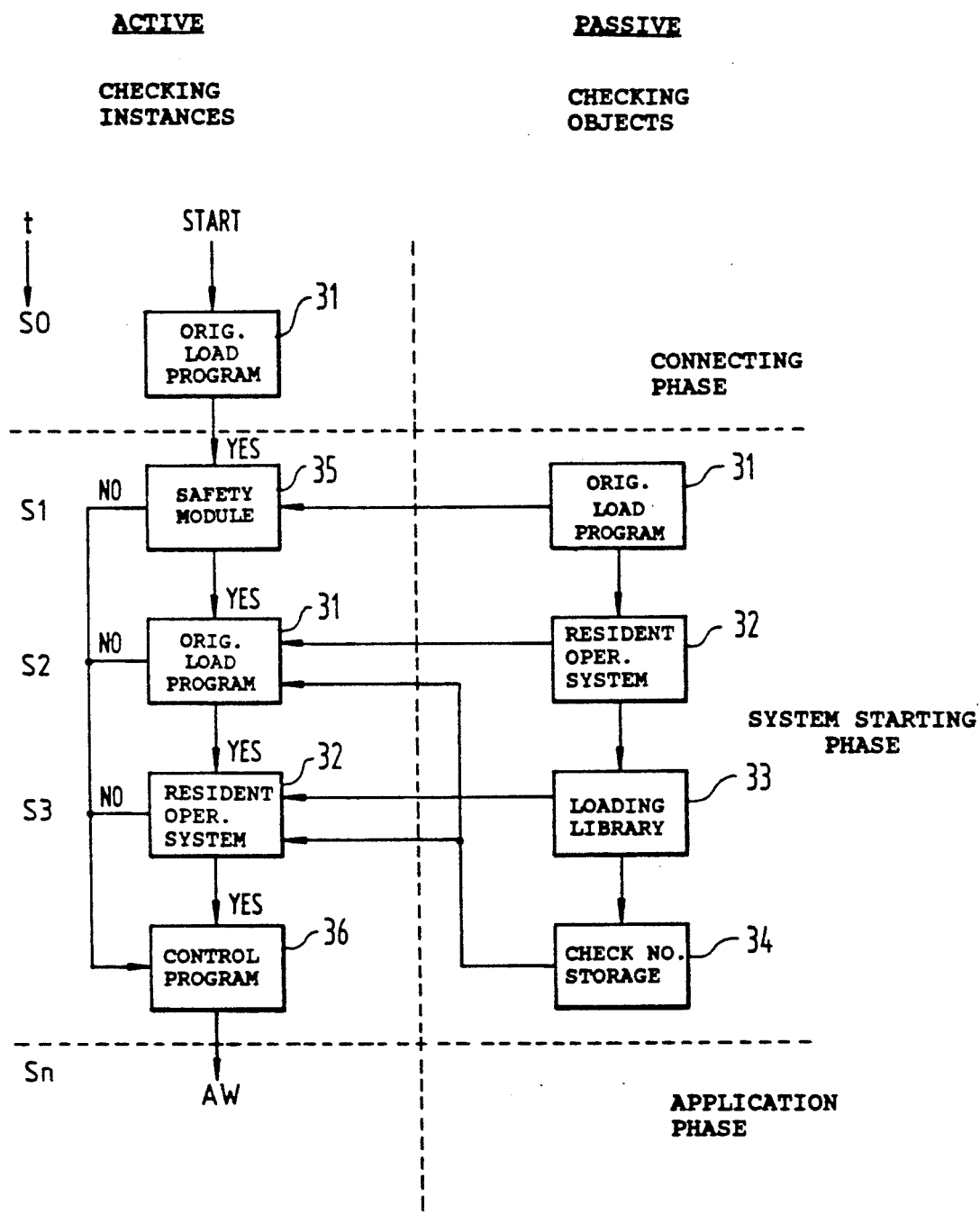
FIG. 3 shows the representation of the course of the successive check steps in a target computer.

FIG. 3 shows how a sequence of check steps of the above-explained type can be performed in a target computer. The check steps are subdivided from above downward into three phases, namely, a switch-on or connecting phase, a system starting phase and an application phase. The active components, as in FIGS. 1 and 2, are illustrated at the left side. The passive components are illustrated at the right side of a vertically dashed line. The individual check steps are designated, numbered consecutively with S0, S1, S2, S3 ... Sn. At each check step S1 to Sn, a checking program is illustrated as an active component and as a passive component that is to be tested. The security module for the actual check step is not shown, since its function has already been explained on the basis of FIG. 2.

By switching on the target computer in the check step S0, a start signal ST is transmitted into the original loading program (e.g., a system boot program) 31 that is started thereby and triggers the check step S1 which becomes thus the first step of the starting phase of the system. By the check step S1, the original loading program 31 is led into the security module 35 as a program that is to be tested, and a check number is computed in it by applying the secret key that is stored in the security module. This check number is then compared with the check number for the original loading program 31 that is stored in it. In case of equality of both check numbers, a yes-logic results by which is triggered the original loading program 31 for the check step S2 so that it becomes an active component for this check step by which the residing operating system 32 is checked. A no-logic emitted by the security module 35 leads into a control program 36 that can interrupt the further starting of the system in a manner that is not illustrated here.

The resident operating system 32 is transferred as a passive component with its individual program parts by the original loading program 31 to a security module (not shown) for check step S2 so that it can be subjected there to a coding that will result in a check number. This check number is compared with one of the check numbers 34 that is led simultaneously into the original loading program 31, and from there into a security module that is connected with it. In case of equality of both check numbers, a yes-logic results that starts the residing operating system 32 and transforms it into an active component that then causes the checking of the program parts from the loading library 33. This check step S3 is executed like the check step S2 so that in case of equality of the check number computed in it with a check number 34 belonging to the program that is to be tested at that time, a yes-logic results that is transferred into the control program 36, which can then start the operation of the application phase by a signal AW.

Further test steps of the described type can naturally be realized within the application phase, as far as the individual application programs in the administration (business) computer have been provided with a check number which can be stored in a check number storage or also in the loading library.

Figure 4:
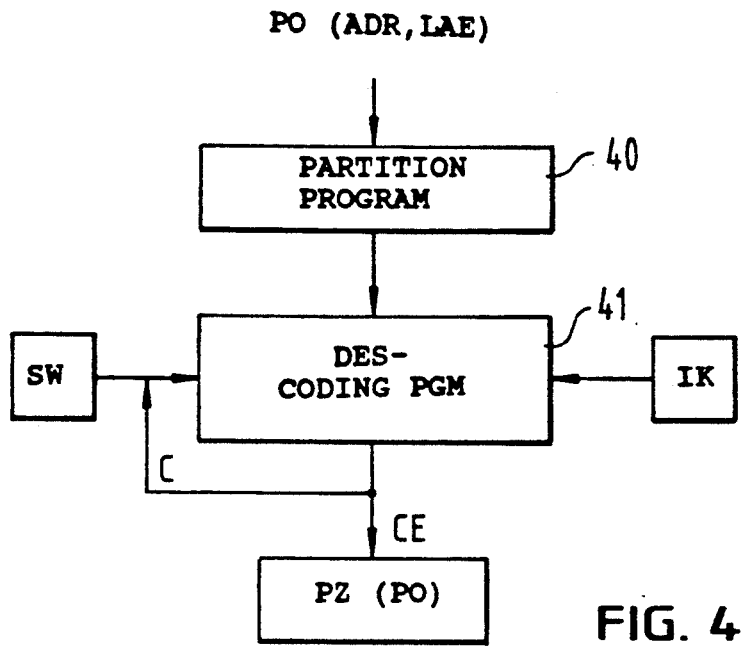
FIG. 4 shows in principle the course of a coding with forming check numbers in a coding module of an administration computer.

Illustrated in FIG. 4 is a preparation of a check number, in block illustration, with a coding module in the administration computer. A program to be checked or a check object PO, for which a check number PZ(PO) is to be computed, is led under indication of an address ADR and a length LAE to a partition program 40, in order to divide the check object into individual blocks B. These blocks B are of equal length and are submitted at the time at least once to DES-coding step of a secret starting value SW and key IK. Coding program 41 serves for this purpose. The result C, occurring by the coding of a block B, is transferred to the coding program 41 as a starting value for the next block to be coded. The result of coding of the last block B is designated by CE and represents the produced check number PA(PO) that is then assigned to a program or can be stored in a security module as for an original loading program check number.

It is noted that this production of a check number can be realized with firmware and software.

Figure 5:
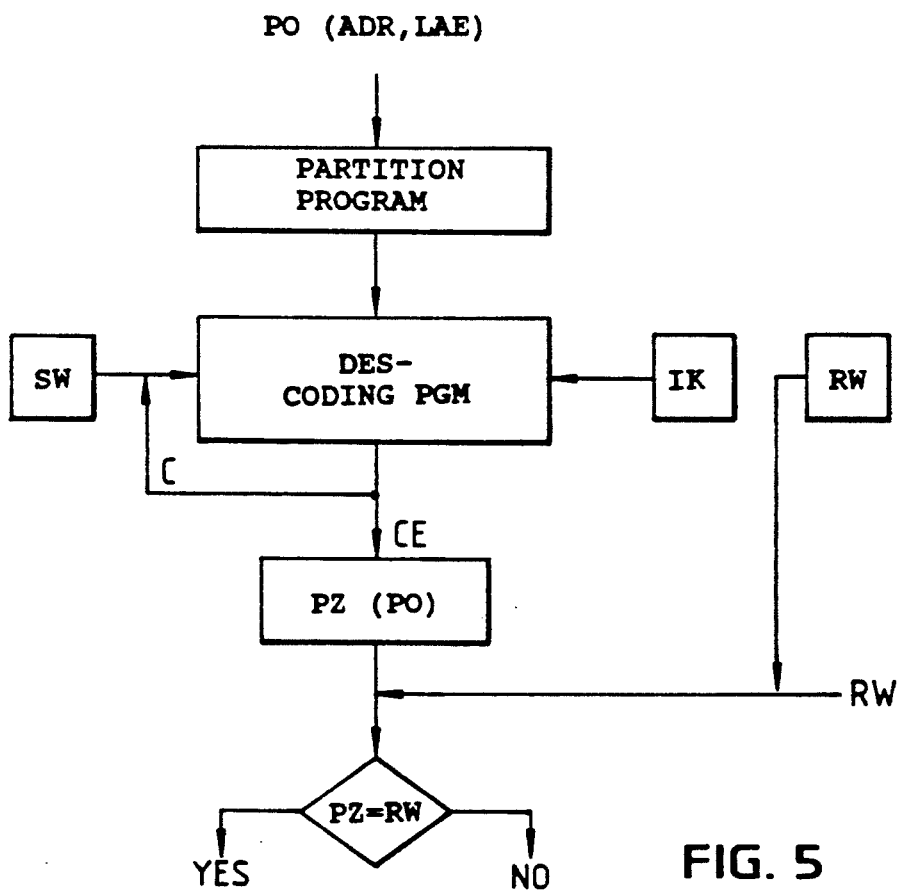
FIG. 5 shows in principle a course of a coding and a check number comparison in a security module of a target computer.

FIG. 5 shows the execution of checking of a check number in a target computer with the help of a security module. The checking of the check number differs only from the described preparation, based on FIG. 4, by input/output parameters and by a comparison process. An additional input parameter is a reference value RW that, according to the computing of the check number PZ(PO), serves as a comparison value. The result of the comparison as yes/no logic controls in an already described manner further check steps or control programs.

The process of checking the check numbers requires for the coding, shown in IG. 4, and checking of the check numbers, shown in FIG. 5, identical coding processes, starting values and keys.

Figure 6:
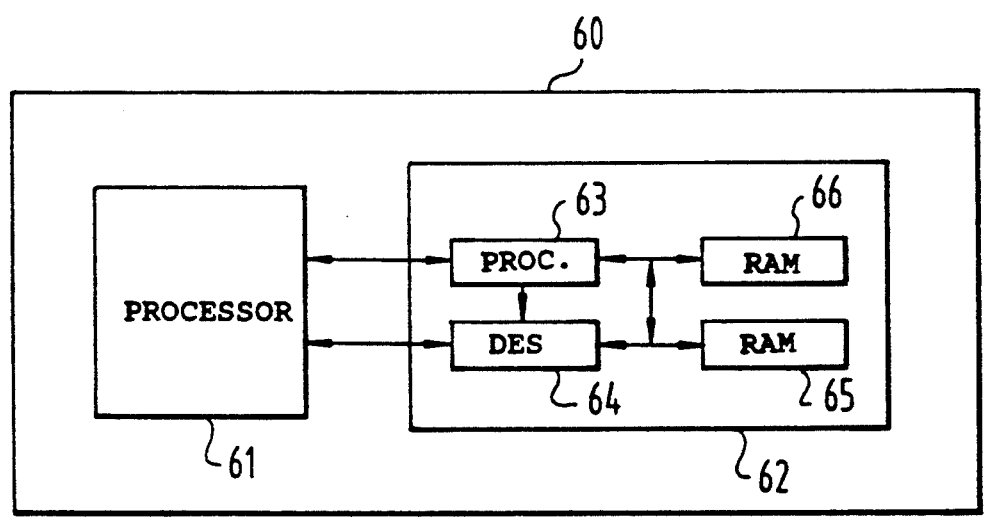
FIG. 6 shows the basic design of a security module.

FIG. 6 shows the fundamental design of a security module 60 as an example of realization. A hardware module that can be in plug-in connection with the target computer, may be used. Commands and data between the target computer and security module are exchanged over this connection. Substantial components of the security module are a processor 61 and a safety hybrid module 62. The processor 61 serves for controlling the individual functions of the security module 60, for example for command decoding, for interconnecting data lines and order transmission to the safety hybrid module 62. This is a module according to the type of an integrated circuit. The modular components are, however, discretely applied and can altogether be provided with a ceramic cover. The hybrid module contains a processor 63, a DES module 64, as well as two key storage memories 65 and 66 with random access. The processor 63 serves for the control and execution of orders and data between the DES module 64 and the readback protected key storage memories 65 and 66. Furthermore, it controls the first external data flow to the processor 61. The DES module 64 performs the described coding process. The key storage 65 serves for receiving keys of a length of, for example, 64 bits which are available to the application for DES coding; the key storage 66 contains keys that can be used by the processor 63 only for internal functions but not by external application programs. An access to a data line within the safety hybrid module is prevented by the mentioned ceramic cover. In case that the connection of the security module 60 with the target computer is interrupted, this will erase the key storage 65. The content of the key storage 66 can be held by a battery. Should the hybrid module 62 be removed from the security module 60, this would cause the loss of all stored values. This ensures that a use of the security module 60 becomes impossible from the outside.

The embodiments of the invention in which an exclusive property or privilege is claimed are defined as follows:

1. In a data processing system having a memory and at least one executable program, a method of protecting against the execution of programs altered without authorization, the method comprising the steps of:
   storing in said computer system a reference checksum generated on the basis of an authorized version of the at least one program by execution of a predetermined cryptographic algorithm;
   generating a program checksum on the basis of a version of the at least one program presented for execution in the computer system, by execution of the predetermined cryptographic algorithm;
   comparing the generated program checksum with the stored reference checksum; and
   blocking execution of the at least one program when the generated checksum differs from the reference checksum.

2. The method in accordance with claim 1 wherein the reference checksum is generated using a secret key.

3. The method in accordance with claim 2 wherein the program checksum is generated using the same secret key.

4. The method in accordance with claim 3 wherein the algorithm is the DES algorithm.

5. The method in accordance with claim 1 wherein the data processing system comprises a read protected memory area and wherein the reference checksum is stored in the read protected area.

6. The method in accordance with claim 1 wherein the system comprises a computer and separate, physically sealed unit electrically connected to the computer and wherein the cryptographic algorithm is stored and executed inside the physically sealed unit.

7. The method in accordance with claim 1 wherein the sealed unit provides to the computer a binary result indicating whether a program checksum generate with respect to a particular program matches the corresponding stored reference checksum.

8. The method in accordance with claim 6 wherein the reference check number of a first of a sequence of programs is stored in read only memory in the computer and the reference checksum for at least one other of the programs is stored in the sealed unit.

9. The method in accordance with claim 1 in a system comprising a plurality of executable programs, including an original loading program which when executed loads other executable programs into the system, wherein a reference checksum is stored for the original loading program and a program checksum is generated, and wherein execution of the original loading program is blocked and no further programs are loaded in the system when the program checksum generated for the loading program differs from the reference checksum for the loading program.

10. The method in accordance with claim 1 wherein an individual reference checksum is stored for each of a plurality of sequentially executable programs and wherein, upon completion of one program, a checksum is generated for a next program to be executed and execution of the next program is initiated only if the checksum generated for the next program does not differ from the reference checksum for the next program.

11. The method in accordance with claim 1 wherein the reference checksum and the program checksum are generated on the basis of the total information content of the authorized version and of the version presented for execution.

12. In a data processing system comprising an administrative computer and at least one target computer and at least one target computer program to be executed on the target computer, a method of protecting against the execution of programs altered without authorization, the method comprising the steps of:
   generating a reference checksum on the basis of an authorized version of the at least one target computer program by execution of a predetermined cryptographic algorithm in the administrative computer;
   storing the reference checksum in a portable memory carrier;
   transferring the carrier to the target computer;
   generating a program checksum on the basis of a version of the at least one program presented for execution in the target computer, by execution of the predetermined cryptographic algorithm;
   comparing the generated program checksum with the reference checksum; and
   executing the at least one program in the target computer only when the comparison indicates that the generated checksum is equal to the corresponding reference checksum.

13. The method in accordance with claim 12 wherein the portable memory carrier comprises a physically sealed unit and wherein the cryptographic algorithm is stored in the memory carrier.

* * * * *

UNITED STATES PATENT AND TRADEMARK OFFICE
CERTIFICATE OF CORRECTION

PATENT NO. : 5,224,160
DATED : June 29, 1993
INVENTOR(S) : WERNER PAULINI et al.

It is certified that error appears in the above-identified patent and that said Letters Patent is hereby corrected as shown below:

Col. 8, claim 7, line 3:
    delete "1" and substitute therefor --6--.

Col. 8, claim 7, line 5:
    delete "generate" and substitute therefor --generated--.

Signed and Sealed this

Seventeenth Day of May, 1994

Attest:

BRUCE LEHMAN

Attesting Officer        Commissioner of Patents and Trademarks